Oct. 13, 1970  J. A. HILL  3,533,305
VARIABLE STEERING WHEEL FOR BICYCLE
Filed Aug. 12, 1968
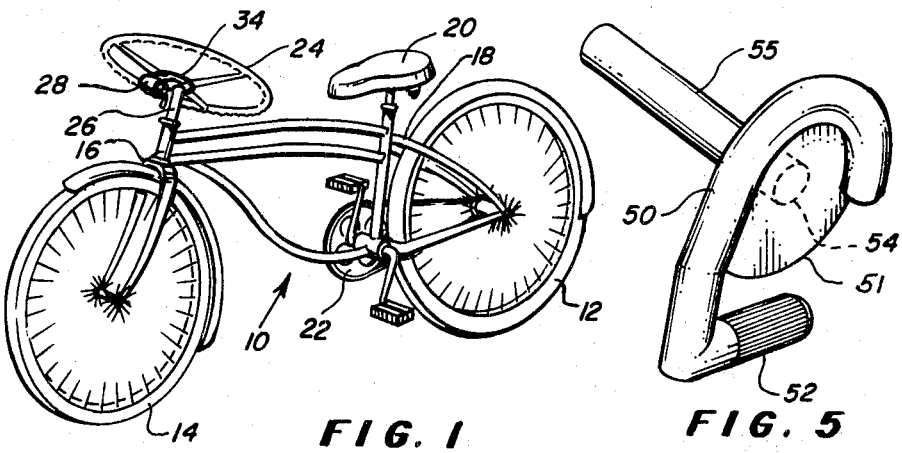
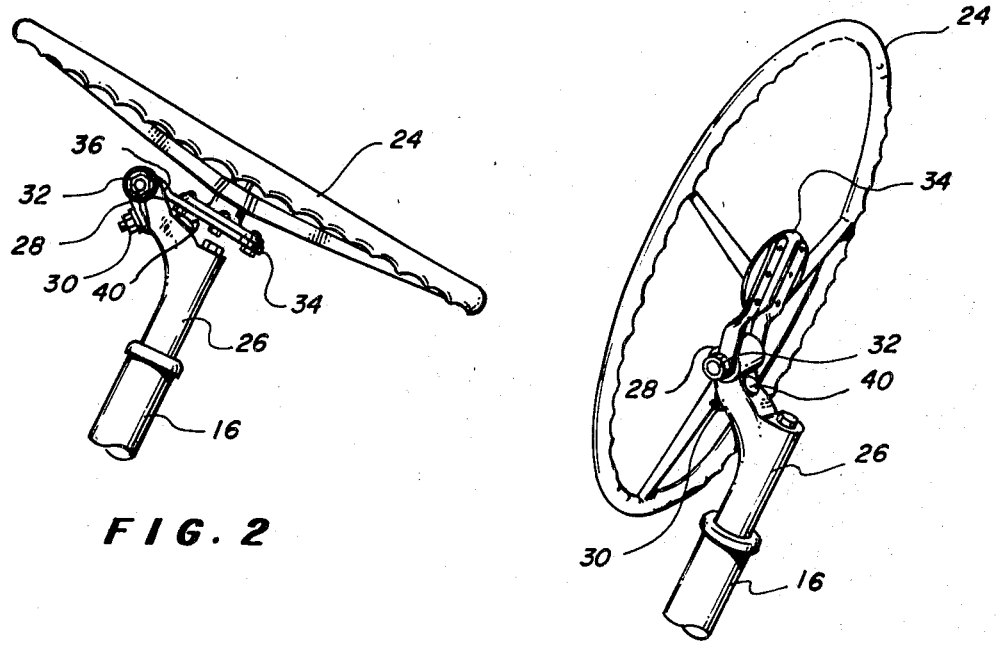
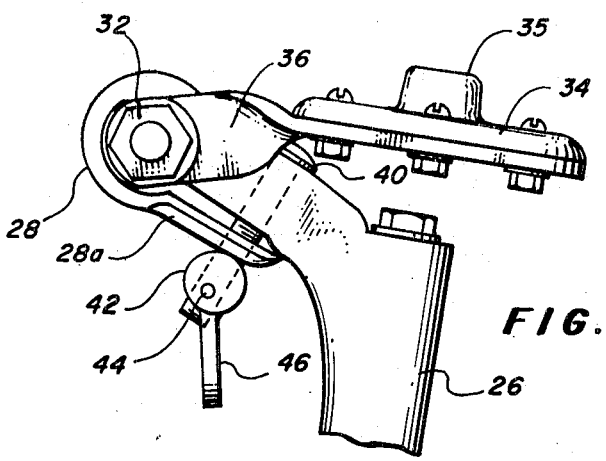
INVENTOR.
John A. Hill
BY
Richard De Law
ATTORNEY

United States Patent Office 3,533,305
Patented Oct. 13, 1970

3,533,305
VARIABLE STEERING WHEEL FOR BICYCLE
John A. Hill, 2569 S. Dahlia St.,
Denver, Colo. 80222
Filed Aug. 12, 1968, Ser. No. 752,021
Int. Cl. B62k 21/16
U.S. Cl. 74—551.3        3 Claims

ABSTRACT OF THE DISCLOSURE

An attachment for the handle bar support post for a bicycle provides a support for a steering wheel arranged to be placed at a variable angle to the post according to the desires of the user, and quick clamp means on the handle bar support post permits change of angle of a steering wheel or handle bars while the bicycle is in use.

---

Circular, portions of circular, and modified circular steering wheels have been used with every variety of four wheel vehicles for many years, and a few adaptations have been suggested for providing a steering wheel for two wheel vehicles, such as bicycles, motorcycles and the like. The adaptation of a steering wheel for two wheel bicycles has been heretofore accomplished by extending the post which telescopes in the front wheel yoke or fork of a bicycle and attaching a steering wheel to or near the top of the post. This arrangement, of course, secures the steering wheel in one position, and if it is desired to replace the steering wheel with conventional handle bars the steering wheel post had to be removed from the fork and a conventional handle bar support replaced in the fork and a handle bar mounted on the support post.

According to the present invention, I provide an adapter which mounts on a conventional handle bar post for bicycles, or other type of two or three wheeler, on which may be mounted a steering wheel, which adapter is readily movable to a variable angle to the post at the desires of the user. In one modification, a quick release clamp is provided on the handle bar support post for quickly changing the angle of the adapter for the steering wheel or for quickly changing the angle of handle bars mounted in the handle bars support post. The adapter includes means for mounting and clamping it in the support post, and means for securing a steering wheel post or column thereon, whereby the loosening of the ring clamp permits the steering wheel to be placed at any angle desired by the user.

Included among the objects and advantages of the present invention is an adapter arranged to fit a conventional handle bar support post for a bicycle or the like, supporting a steering wheel at a variable angle to the post.

Another object of the invention is to provide means for a variable-angle steering wheel for a two wheel vehicle.

A further object of the invention is to provide quick clamp means for the steering mechanism of a two wheel vehicle for changing the angle of the steering mechanism to its supporting post.

These and other objects and advantages of the invention may be readily ascertained by referring to the following description and appended illustrations in which:

FIG. 1 is a perspective view of a bicycle, illustrating the use of an adapter according to the invention, mounting a steering wheel on a two wheel bicycle;

FIG. 2 is a side elevational, enlarged detailed view of the adapter of the invention;

FIG. 3 is a side elevational view of the adapter of the invention in a different position of the steering wheel in relation to the supporting post;

FIG. 4 is an enlarged detail view of one form of adapter with quick clamp means for the clamp ring of a handle bar support post according to the invention; and FIG. 5 is a perspective view of a modified form of the adapter of the invention.

The bicycle illustrated in FIG. 1 includes a frame member 10, which is generally conventional, a rear wheel 12 and a front wheel 14 mounted in generally conventional manner. The front wheel is mounted in a front wheel fork 16 supporting the front wheel, and a forked frame extension 18 supports the rear wheel. A seat 20 is mounted on the frame, and conventional chain and pedal means 22 provides motive power for the bicycle. A steering wheel 24 is mounted, as described below, on a handle bar support post which telescopes in the front fork 16 to provide a steering mechanism for the bicycle. As shown in detail in FIG. 2, a handle bar support post 26 extends into the front fork 16 and it includes a ring clamp 28 which is tightened by means of a bolt and nut arrangement 30. A tubular member 32 is releasably secured in the ring clamp. Attached to the tubular member 32 is a steering wheel post support member 34 by means of a yoke 36 attached to opposite ends of the tubular member 32. The steering wheel 24 may be attached directly by its hub to member 34 or a length of shaft or steering column may be placed between the steering wheel and the member 34 to raise the steering wheel to the height desired. Also, as the steering of the bicycle is accomplished by turning the fork, there must be an essentially rigid connection between the steering wheel and the fork, thus the steering wheel does not turn on the member 34. The angular relation of the steering wheel 24 to the post 26 is readily adjusted by loosening the nut 30, moving the steering wheel to the desired position, and retightening the nut. Furthermore, the post may be turned completely around and the steering wheel elevated to a almost vertical position as shown in FIG. 3 to provide a different type of steering for the two wheeler.

In place of the nut and bolt 30, a quick release may be provided for the clamp, as illustrated in FIG. 4, wherein a headed pin 40, passing through the opening in the goose neck of the post 26, extends through the arm 28a of the ring clamp 28. The pin is secured in position by an eccentric 42 rotatably mounted on a pin 44. The eccentric may be mounted in a slot in the pin 40 or may be positioned beside the pin. A handle 46 depending from eccentric provides means for rotating the eccentric wheel 42 to loosen from or clamp tightly against the arm 28a of the ring clamp 28. This provides means for quickly changing the angle of the steering wheel during operation of the vehicle if desired. Furthermore, the goose neck and post will accommodate standard handle bars and these handle bars may be adjusted to a different angle at the desires of the user while in actual motivation. This feature is particularly desirable where the bicycle is used for long distances so as to change the position of the steering mechanism for the rider's comfort.

The modification shown in FIG. 5 uses a disc 51 to support a steering column or shaft 55 on one side and a goose neck bracket 50 on the opposite side. The bracket includes a tube portion 52 which slips in the clamp of the goose neck. The disc 51 includes a hub 54 for the steering column to provide a mount for the column on the disc. This arrangement is easily inserted in the goose neck clamp as it telescopes in the clamp from one side. With the modification of FIGS. 2, 3 and 4, the yoke must be disassembled, the tubular member 32 placed in the clamp and then the yoke reassembled. The modification of FIG. 5 is utilized in the same manner as the other modification, supporting a steering wheel in various angles to the wheel forks.

The invention has been illustrated with reference to a bicycle, it is understood, however, that it is adaptable to other two or three wheelers, commonly referred to as motor bikes, motorcycles, skooters, and tricycles, etc. In such instances where the vehicle has a motor or engine, however, means must be provided for the various controls normally found on handles of the steering bar, including such as a throttle, brake, spark, etc. Such controls are of course conventional and easily adapted to a steering wheel.

I claim:

1. An attachment for a handle bar support post for a two or three wheel vehicle having a clamp-ring for handle bars and the like, comprising tubular mating means for telescoping in said clamp ring on said post; means depending from said tubular mating means supporting a circular steering wheel support flat-wise thereon; means mounting a steering wheel on said steering wheel support; and means for temporarily securing said clamp-ring on said tubular mating means for providing a variable angle between said steering wheel support and its carried steering wheel and said post.

2. An attachment according to claim 1 wherein said means depending from said tubular mating means is a yoke secured to opposite sides of said tubular member.

3. An attachment according to claim 1 wherein said means depending from said tubular mating means is an integral tubular brace member secured to only one side of said tubular mating means in close proximity to said tubular mating means and having its end curved to conform to the curve of said circular steering wheel support and secured thereto.

References Cited

UNITED STATES PATENTS

| 2,059,669 | 11/1936 | Skoog | 74—551.1 |
| 3,336,817 | 8/1967 | Madden | 75—552 |

FOREIGN PATENTS

| 203,007 | 6/1939 | Switzerland. |

FREDERICK L. MATTESON, JR., Primary Examiner
F. D. SHOEMAKER, Assistant Examiner U.S. Cl. X.R.

74—552